United States Patent [19]

Tamehiro et al.

[11] Patent Number: 5,183,198
[45] Date of Patent: Feb. 2, 1993

[54] METHOD OF PRODUCING CLAD STEEL PLATE HAVING GOOD LOW-TEMPERATURE TOUGHNESS

[75] Inventors: Hiroshi Tamehiro; Yoshinori Ogata; Yoshio Terada, all of Kimitsu, Japan

[73] Assignee: Nippon Steel Corporation, Tokyo, Japan

[21] Appl. No.: 793,959

[22] Filed: Nov. 15, 1991

[30] Foreign Application Priority Data

Nov. 28, 1990 [JP] Japan .................. 2-328310

[51] Int. Cl.⁵ ............................ B23K 31/02
[52] U.S. Cl. .................... 228/186; 228/231; 228/263.15; 428/679; 428/683; 148/529
[58] Field of Search .......... 228/231, 263.15, 191, 228/186, 235; 420/126, 127, 128; 428/679, 683; 148/12 E, 12 EA

[56] References Cited

U.S. PATENT DOCUMENTS

| | | | |
|---|---|---|---|
| 4,360,391 | 11/1982 | Yamamura et al. | 148/12 E |
| 4,464,209 | 8/1984 | Taira et al. | 428/683 |
| 4,736,884 | 4/1988 | Tsuyama et al. | 228/235 |
| 4,755,233 | 7/1988 | Baralis et al. | 148/12 EA |
| 4,795,078 | 6/1988 | Kuroki et al. | 228/131 |
| 4,842,816 | 6/1989 | Miyasaka et al. | 420/126 |
| 4,908,280 | 3/1990 | Omura et al. | 428/679 |
| 4,917,969 | 4/1990 | Pircher et al. | 228/231 |
| 4,960,470 | 10/1990 | Honkura et al. | 148/12 E |

FOREIGN PATENT DOCUMENTS 60-216984 10/1985 Japan .
62-16892 1/1987 Japan .
63-130283 6/1988 Japan .

*Primary Examiner*—Richard K. Seidel
*Assistant Examiner*—Chuck Y. Mah
*Attorney, Agent, or Firm*—Wenderoth, Lind & Ponack

[57] ABSTRACT

A method of producing clad steel plate comprises the steps of preparing an assembly slab by superposing a stainless-steel or nickel alloy cladding material onto base metal consisting essentially of, by weight, 0.020 to 0.06% carbon, 0.5% or less silicon, 1.0 to 1.8% manganese, 0.03% or less phosphorus, 0.005% or less sulfur, 0.08 to 0.15% niobium, 0.005 to 0.03% titanium, 0.05% or less aluminum, 0.002 to 0.006% nitrogen, and one or two elements selected from among a group consisting of 0.05 to 1.0% nickel, 0.05 to 1.0% copper, 0.05 to 0.5% chromium, 0.05 to 0.3% molybdenum and 0.001 to 0.005% calcium, with the balance being iron and unavoidable impurities, and welding its periphery; heating the slab to 1100° to 1250° C.; rolling the slab at a reduction ratio of 5 or more and a rolling finish temperature of 900° to 1050° C.; air cooling for 60 to 200 seconds; cooling the slab from a temperature of at least 750° C. to 555° C. or below at a cooling rate of 5° to 40° C./sec, and following this by air cooling.

4 Claims, No Drawings

METHOD OF PRODUCING CLAD STEEL PLATE HAVING GOOD LOW-TEMPERATURE TOUGHNESS

BACKGROUND OF THE INVENTION

1. Field of the Invention

This invention relates to a method of producing clad steel plate having good low-temperature toughness in its as-rolled condition, in which the cladding material is a stainless steel, nickel alloy or other high alloy having good corrosion-resistance, and the base metal is a designated low alloy (low C - Mn - high Nb - trace Ti).

2. Description of the Prior Art

Considerations of safety and economic efficiency are resulting in increasing use of steel pipe clad with high alloy cladding materials such as stainless steel and nickel alloy for large-diameter pipelines used for transporting crude oil and natural gas, which contain a high level of corrosive substances such as $H_2S$, $CO_2$ and $Cl^-$.

Conventionally such pipes have been manufactured by UOE forming of rolled clad steel plate, welding the seam, and reheating and cooling (solution treatment) of the whole pipe. Recently, however, techniques have been developed that are aimed at achieving the requisite properties in the as-rolled condition, i.e. without the use of solution treatment. Such techniques are disclosed by JP-A60-216984, JP-A62-16892 and JP-A63-130283, for example.

However, with these methods it is exceedingly difficult to obtain cladding material that has good corrosion-resistance together with a base metal that has good tensile strength and low-temperature toughness. The reason for this is that, while rolling at higher temperatures (at or above 900° C.) improves the corrosion-resistance of the cladding material, the low-temperature toughness of the base metal is improved by rolling at a low temperature. As a result, the need to use a lower rolling temperature in the prior art has meant that the corrosion-resistance of the clad steel has suffered.

SUMMARY OF THE INVENTION

The object of the present invention is to provide a method of producing high-alloy-clad steel plate in which high corrosion-resistance of the cladding material is combined with high tensile strength and low-temperature toughness of the base metal.

DETAILED DESCRIPTION OF THE INVENTION

The present invention is directed to a method of producing clad steel plate comprising the steps of obtaining an assembly slab by superposing a cladding material consisting of stainless-steel or nickel alloy, and a base metal consisting essentially of, by weight,

| | |
|---|---|
| Carbon | 0.020 to 0.06% |
| Silicon | 0.5% or less |
| Manganese | 1.0 to 1.8% |
| Phosphorus | 0.03% or less |
| Sulfur | 0.005% or less |
| Niobium | 0.08 to 0.15% |
| Titanium | 0.005 to 0.03% |
| Aluminum | 0.05% or less |
| Nitrogen | 0.002 to 0.006% | and which also contains, if necessary, one or two elements selected from among a group consisting of, by weight,

| | |
|---|---|
| Nickel | 0.05 to 1.0% |
| Copper | 0.05 to 1.0% |
| Chromium | 0.05 to 0.5% |
| Molybdenum | 0.05 to 0.3% |
| Calcium | 0.001 to 0.005% | with the balance being iron and unavoidable impurities, and seal-welding its periphery; heating the slab to a temperature in the range 1100° to 1250° C.; rolling the slab at a reduction ratio of 5 or more and a rolling finish temperature of 900° to 1050° C.; following the rolling with air cooling for 60 to 200 seconds; cooling the slab from a temperature of at least 750° C. to an arbitrary temperature of 550° C. or below at a cooling rate of 5° to 40° C./sec, and following this by air cooling.

The stainless-steel of this invention is an austenitic, ferritic, martensitic or duplex steel, and the nickel alloy is a material such as Incoloy 825 or Inconel 625 that has high corrosion-resistance. The base metal is a low alloy with the following properties (values parallel to the rolling direction and at right-angles thereto): a minimum tensile strength of X52 (API Standard) and low-temperature toughness of $2vE_{-30} \geq 10kg$ f-m, $vTrs \leq -60°$ C.

Thus, in accordance with the present invention the assembly slab is prepared by superposing the cladding material on the base metal and welding the two together around the periphery. As such, it is preferable to smooth the contact surfaces of base metal and cladding material beforehand by grinding or the like, then clean the surfaces by degreasing and use a vacuum pump to ensure the removal of air from between the surfaces. Alternatively, a sandwich type arrangement may be used consisting of sandwiching a separating material (such as $Al_2O_3$) between the cladding material of two slabs prepared by the above process, followed by seal-welding of the periphery.

Details of the present invention will now be explained. The distinguishing feature of the present invention is that, using a low C - high Nb - trace Ti base metal, it is possible to obtain a cladding material that is highly corrosion-resistant while at the same time obtaining a base metal having high tensile strength and toughness even when finish rolling is performed at a high temperature. To achieve cladding material having high corrosion-resistance, alloy elements are dissolved during the reheating, and high-temperature rolling of the slab is then followed by air cooling for an appropriate period to promote the recrystallization of the γ structure, and in addition the precipitation of σ phase (Cr carbides) and the like has to be suppressed by using quenching.

However, rolling the base metal at the kind of high temperature needed for this recrystallization results in insufficient refinement of the grain size and, therefore, lack of sufficient low-temperature toughness. Studies were therefore carried out to find a base metal composition that would provide a good balance between tensile strength and toughness even when a high rolling finish temperature is used. These studies led to the discovery that the addition of high Nb to low C - trace Ti steel was effective, and a new method of producing clad steel plate was invented by applying this to rolled clad steel.

High Nb steel has been reported in Metals Technology, vol. 11 (1984), pages 535 and 545, and in the Niobium Technical Report 8 (1990), but there is no mention of research relating to its application to high alloy clad steel plate.

The reheating, rolling and cooling conditions used in the present invention will now be described. In accordance with this invention the assembly slab is reheated at a temperature of 1100°–1250° C. It is necessary to do this to ensure the corrosion-resistance of the cladding material together with the tensile strength and toughness of the base metal. The lower limit of 1100° C. is required to ensure sufficient dissolution to provide the cladding material with good corrosion-resistance and for the $\gamma$ structure recrystallization that follows finish rolling at a temperature of 900° C. or higher. However, a reheating at over 1250° C. will produce a coarsening of the austenite ($\gamma$) grains, and of the grain size after rolling, degrading the low-temperature toughness of the base metal.

The reheated slab has to be rolled at a finish temperature of 900°–1050° C. and a reduction ratio in the range of 5 to 12, more preferably in the range of 6 to 12. The lower limit of 5 is specified (1) to ensure that there is perfect metallurgical bonding between cladding material and base metal and (2) to refine the grain size of the base metal. Perfect metallurgical bonding between cladding material and base metal is required to ensure the service performance of the cladding material, and a higher reduction ratio results in a better performance. The minimum reduction ratio depends on the reheating temperature and on rolling temperature; in the case of the present invention in which a high rolling temperature is used, the minimum reduction ratio is 5.

In accordance with this invention, rolling is finished at 900°–1050° C. If the rolling is finished at a temperature below 900° C., recrystallization of the $\gamma$ structure of the cladding material will not take place, resulting in a marked deterioration in the corrosion-resistance (for example pitting corrosion-resistance measured after immersion for 48 hours in a 10% solution of $FeCl_3 \cdot 6 \cdot H_2O$). With respect to corrosion-resistance, the higher the rolling finish temperature the better. However, too high a temperature can result in a degradation of the low-temperature toughness by preventing refinement of the crystal grains of the base metal, hence a maximum rolling finish temperature of 1050° C. has been specified.

In further accordance with this invention, after the rolling is finished the slab is air cooled for 60 to 200 seconds, cooled from a temperature of at least 750° C. to an arbitrary temperature of 550° C. or below at a cooling rate of 5° to 40° C./sec, and this is followed by air cooling to the ambient temperature. The air cooling following the rolling is to promote the recrystallization of the $\gamma$ structure and enhance the corrosion-resistance. Good corrosion-resistance will not be obtained if instead of this air cooling the slab is directly quenched after being rolled. This air cooling has to last at least 60 seconds. On the other hand, too long an air cooling period can allow the temperature of the clad steel to drop, precipitating $\sigma$ phase (Cr carbides) and degrading the corrosion resistance of the cladding material. Thus, while it depends on the thickness of the steel, an upper limit of 200 seconds has been specified for the air cooling period, and it is also necessary to apply water cooling from a temperature of at least 750° C. It is necessary to cool the steel to 550° C. or below at a cooling rate of 5° to 40° C./sec so that (1) the precipitation of $\sigma$ phase (Cr carbides) is suppressed and (2) the base metal is toughened by the accelerated cooling. After cooling the steel to below a prescribed temperature, it is air cooled. Moreover, reheating (tempering) the clad steel at a temperature below the transformation point $Ac_1$ to improve the low-temperature toughness and for dehydrogenation and other such purposes has no adverse effect on the distinguishing features of the invention.

The reasons for the specified limitations on the alloying elements of the base metal will now be explained.

To ensure the tensile strength and low-temperature toughness of the base metal as well as the corrosion-resistance of the cladding material, the invention specifies the chemical composition of 0.020 to 0.06% C, 1.0 to 1.8% Mn, 0.08 to 0.15% Nb and 0.005 to 0.03% Ti.

In the case of C and Mn, the lower limits are the minimum amounts that have to be added for the Nb to bring out the precipitation hardening and grain size refinement effects of these elements to ensure the strength and toughness of the base metal and welded portions. The specified maximum amounts are the upper limits that have to be observed in order to produce a base metal with good low-temperature toughness and field weldability. If the C content is too high, carbon will diffuse into the cladding material when the assembly slab is reheated, reducing the corrosion resistance. Therefore, specifying an upper limit of 0.06% for the carbon content of the base metal is also done to ensure the corrosion-resistance of the cladding material.

Niobium and titanium are essential elements in this invention, in the amounts of 0.08 to 0.15% for niobium and 0.005 to 0.03% for titanium. In controlled rolling, niobium contributes to grain refinement and precipitation hardening, thereby strengthening and toughening the steel. For the purposes of this invention which specifies a high rolling finishing temperature of at least 900° C., the addition of at least 0.08% Nb is required. This promotes grain refinement and precipitation hardening, resulting in clad steel with a higher tensile strength and toughness than clad steel produced by the conventional method. An upper limit of 0.15% Nb is specified because a higher level will reduce the weldability and the toughness of the welded portions.

By forming fine-grained TiN and suppressing the coarsening of $\gamma$ grains at welded portions and during the reheating of the slab, titanium enhances the toughness of the base metal and of weld heat-affected zones. This is particularly important for the steel of this invention which is finish rolled at a high temperature. For the TiN to be fully effective at least 0.005% Ti is required. As excessive titanium will produce coarsening of the TiN and give rise to precipitation hardening caused by TiC, thereby degrading the low-temperature toughness, 0.03% has been specified as the upper limit.

The reasons for the specified limitations on the other elements will now be explained.

Silicon increases the strength and toughness of steel, but too much silicon can reduce weldability and the toughness of the heat-affected zones, hence an upper limit of 0.5% has been specified. As titanium has a sufficient deoxidization effect, the addition of silicon is not essential.

The impurities phosphorus and sulfur are limited to 0.03% and 0.005% respectively with the aim of further improving the low-temperature toughness of the base metal and welded portions. Reducing the P content prevents intergranular fracture, while low S prevents the toughness being impaired by MnS. Preferably, phosphorus should be controlled to 0.01% or less and sulfur to 0.003% or less.

Aluminum is usually included in steel as a deoxidization agent, but as titanium or silicon can also be used for this, aluminum is not an essential element. An upper limit of 0.05% Al is specified, as a higher aluminum content causes an increase in the amount of aluminate inclusions, impairing the cleanness of the steel.

Nitrogen improves the toughness of the base metal and heat-affected zones by forming TiN, which suppresses the coarsening of $\gamma$ grains. For this, at least 0.002% is required. Too much nitrogen can produce surface defects, and in the form of solid-solution nitrogen, can impair the toughness of heat-affected zones, so it is necessary to limit the maximum nitrogen content to 0.006%.

The reasons for adding nickel copper, chromium, molybdenum and calcium will now be explained.

The main object of adding these elements to the base chemical composition is to improve the tensile strength, toughness and other properties of the base metal without adversely affecting the superior qualities of the inventive steel. As such, these elements have their own limits.

Nickel improves the strength and toughness of the steel without any adverse effect on weldability or on the toughness of heat-affected zones. When the copper is also added, nickel has the additional effect of preventing hot-cracking during plate rolling. The limit of 1.0% is based on cost considerations. Copper improves corrosion resistance and resistance against hydrogen-induced cracking, but in amounts over the specified limit of 1.0% can impede production by causing hot-cracking during plate rolling. Chromium and molybdenum both improve the strength of the steel, but in excessive amounts impair weldability and the toughness of heat-affected zones. Therefore an upper limit of 0.5% has been specified for chromium and 0.3% for molybdenum. The lower limit of 0.05% for nickel, copper, chromium and molybdenum is the minimum amount required for the element to exhibit its effect.

Calcium controls the shape of sulfides (MnS) and improves low-temperature toughness (such as Charpy test values), and also is highly effective for improving resistance to hydrogen-induced cracking. At least 0.001% Ca is required to obtain these effects, but adding more than 0.005% will give rise to large amounts of CaO and CaS, causing the formation of large inclusions, impairing the cleanness of the steel as well as the toughness and weldability. An effective way of improving resistance to hydrogen-induced cracking is to reduce the sulfur and oxygen contents to not more than 0.001% and 0.002% respectively.

The present invention makes it possible to produce high quality clad steel for pipe and other applications in which the base metal has high tensile strength and low-temperature toughness combined with highly corrosion-resistant cladding material, and there is no need to subject the entire pipe to solution treatment. The method of this invention can therefore be used to save energy and reduce the amount of work operations. In addition, it provides a marked improvement in pipeline safety. While a heavy plate mill is the preferred application for the method of the invention, it can also be applied to the production of hot coil. The excellent low-temperature toughness and weldability of steel produced by this method makes it particularly suitable for cold-region pipelines.

EXAMPLES

Continuous casting was used to manufacture base metal steel slabs. These slabs were of various compositions and had a thickness of 240 mm. The slabs were then rolled to a prescribed thickness and one surface of each slab was mechanically smoothed and overlaid by cladding material consisting of various thicknesses of stainless steel (SUS 316L) or Incoloy 825 to form an assembly slab which was then seal-welded around its periphery. For this, the cladding material had been rolled to a thickness of 3 mm.

Sandwich type assembly slabs were further prepared by sandwiching a separating material between two slabs of cladding material prepared as described above, and the periphery was then welded. The full area of the contact surfaces was smoothed, cleaned, degreased, and a vacuum pump was used to remove any air between the contact surfaces.

These sandwich assembly slabs were then subjected to reheating, rolling and cooling steps under various conditions to produce clad steel materials. This was followed by an investigation of base metal tensile strength and low-temperature toughness (using the Charpy impact test), the corrosion-resistance of the cladding material (through evaluation of the presence or absence of pitting corrosion after immersion in a 10% solution $FeCl_3 \cdot 6H_2O$ for 48 hours at 15° C. in the case of SUS 316L and 30° C. in the case of Incoloy 825), and the bonding between base metal and cladding material (by ultrasonic probe). Details of conditions, compositions, and results are listed in Table 1.

The base metal and cladding material of the clad steels produced by the method of the present invention (Specimens No. 1 to 10) exhibited good properties. In contrast, the base metal or the cladding material of the comparative steels not produced by the method of the present invention (Specimens No. 11 to 26) exhibited inferior properties.

High carbon and low manganese in the case of No. 11, and insufficient niobium in the case of No. 12, resulted in poor low-temperature toughness. The poor low-temperature toughness of No. 13 was caused by the absence of titanium, while in the case of No. 14 the cause was low nitrogen. The poor low-temperature toughness of No. 15 was caused by too much nitrogen. In the case of No. 16, excessive silicon and manganese resulted in good tensile strength but poor low-temperature toughness. The poor strength, corrosion-resistance and bonding between base metal and cladding material of No. 17 were the result of reheating at too low a temperature, while in the case of No. 18 the low-temperature toughness was degraded by a reheating temperature that was too high. A low rolling finishing temperature degraded the corrosion-resistance of No. 19, while a rolling finishing temperature that was too high was the cause of the poor low-temperature toughness exhibited by No. 20. In the case of No. 21, the poor corrosion-resistance shows the adverse effect of using an air-cooling period that was too short. The poor strength and corrosion-resistance of No. 22, on the other hand, were caused by an overlong period of air cooling that delayed the start of the water cooling. An excessively low cooling rate was the cause of the poor strength and corrosion-resistance of No. 23, while the poor low-temperature toughness of No. 24 was caused by a cooling rate that was too high. In the case of No. 25, the low reduction ratio resulted in insufficient adhesion between cladding material and base metal. The strength and corrosion-resistance of No. 26 were degraded by stopping the water cooling at too high a temperature.

TABLE 1

| | No. | Chemical composition (wt %, *ppm) | | | | | | | | | |
|---|---|---|---|---|---|---|---|---|---|---|---|
| | | C | Si | Mn | P | S | Nb | Ti | Al | *N | other |
| Inventive steels | 1 | 0.032 | 0.23 | 1.51 | 0.008 | 0.001 | 0.098 | 0.009 | 0.024 | 34 | |
| | 2 | 0.034 | 0.28 | 1.42 | 0.012 | 0.002 | 0.143 | 0.020 | 0.018 | 54 | |
| | 3 | 0.051 | 0.08 | 1.24 | 0.003 | 0.003 | 0.105 | 0.012 | 0.002 | 23 | |
| | 4 | 0.023 | 0.23 | 1.75 | 0.007 | 0.001 | 0.110 | 0.016 | 0.043 | 35 | |
| | 5 | 0.040 | 0.35 | 1.55 | 0.005 | 0.006 | 0.092 | 0.018 | 0.011 | 23 | |
| | 6 | 0.018 | 0.25 | 1.56 | 0.003 | 0.002 | 0.084 | 0.007 | 0.033 | 25 | |
| | 7 | 0.033 | 0.24 | 1.49 | 0.020 | 0.002 | 0.103 | 0.015 | 0.023 | 37 | 0.35 Ni |
| | 8 | 0.025 | 0.12 | 1.38 | 0.013 | 0.001 | 0.120 | 0.013 | 0.015 | 28 | 0.12 Mo, 0.0035 Ca |
| | 9 | 0.031 | 0.23 | 1.25 | 0.004 | 0.001 | 0.105 | 0.013 | 0.014 | 22 | 0.21 Cr, 0.0023 Ca |
| | 10 | 0.029 | 0.33 | 1.58 | 0.012 | 0.002 | 0.092 | 0.008 | 0.010 | 36 | 0.25 Ni, 0.28 Cu |
| Comparative steels | 11 | 0.081 | 0.18 | 0.98 | 0.005 | 0.001 | 0.105 | 0.016 | 0.027 | 33 | |
| | 12 | 0.023 | 0.28 | 1.57 | 0.003 | 0.002 | 0.070 | 0.018 | 0.021 | 35 | 0.23 Ni |
| | 13 | 0.035 | 0.23 | 1.42 | 0.015 | 0.002 | 0.098 | — | 0.017 | 26 | |
| | 14 | 0.032 | 0.25 | 1.62 | 0.009 | 0.001 | 0.105 | 0.011 | 0.027 | 16 | |
| | 15 | 0.033 | 0.18 | 1.54 | 0.008 | 0.002 | 0.104 | 0.018 | 0.021 | 62 | |
| | 16 | 0.034 | 0.57 | 1.89 | 0.006 | 0.001 | 0.120 | 0.016 | 0.018 | 23 | |
| | 17 | 0.032 | 0.28 | 1.54 | 0.008 | 0.002 | 0.105 | 0.012 | 0.023 | 38 | |
| | 18 | 0.032 | 0.28 | 1.54 | 0.008 | 0.002 | 0.105 | 0.012 | 0.023 | 38 | |
| | 19 | 0.032 | 0.28 | 1.54 | 0.008 | 0.002 | 0.105 | 0.012 | 0.023 | 38 | |
| | 20 | 0.032 | 0.28 | 1.54 | 0.008 | 0.002 | 0.105 | 0.012 | 0.023 | 38 | |
| | 21 | 0.032 | 0.28 | 1.54 | 0.008 | 0.002 | 0.105 | 0.012 | 0.023 | 38 | |
| | 22 | 0.032 | 0.28 | 1.54 | 0.008 | 0.002 | 0.105 | 0.012 | 0.023 | 38 | |
| | 23 | 0.032 | 0.28 | 1.54 | 0.008 | 0.002 | 0.105 | 0.012 | 0.023 | 38 | |
| | 24 | 0.032 | 0.28 | 1.54 | 0.008 | 0.002 | 0.105 | 0.012 | 0.023 | 38 | |
| | 25 | 0.032 | 0.28 | 1.54 | 0.008 | 0.002 | 0.105 | 0.012 | 0.023 | 38 | |
| | 26 | 0.032 | 0.28 | 1.54 | 0.008 | 0.002 | 0.105 | 0.012 | 0.023 | 38 | |

| | No. | Production conditions | | | | | | | | |
|---|---|---|---|---|---|---|---|---|---|---|
| | | Reheating temperature (°C.) | Reduction ratio | Finishing rolling temperature (°C.) | Air cooling period (sec) | Water cooling starting temperature (°C.) | Cooling rate (°C./sec) | Water cooling stopping temperature (°C.) | Steel thickness (after separation) (mm) | Remarks (cladding material) |
| Inventive Steels | 1 | 1150 | 8.0 | 960 | 120 | 880 | 12 | 480 | 25 | Incoloy 825 |
| | 2 | 1150 | 10.0 | 1020 | 80 | 920 | 22 | 500 | 20 | Incoloy 825 |
| | 3 | 1200 | 11.8 | 940 | 120 | 790 | 32 | 520 | 17 | Incoloy 825 |
| | 4 | 1120 | 6.7 | 910 | 145 | 860 | 9 | 370 | 30 | Incoloy 825 |
| | 5 | 1150 | 10.0 | 1000 | 160 | 780 | 16 | 420 | 20 | Incoloy 825 |
| | 6 | 1150 | 10.0 | 930 | 70 | 850 | 30 | Room temperature | 20 | Incoloy 825 |
| | 7 | 1150 | 8.0 | 920 | 160 | 760 | 18 | 430 | 25 | Incoloy 825 |
| | 8 | 1100 | 5.6 | 920 | 120 | 840 | 7 | 450 | 36 | Incoloy 825 |
| | 9 | 1200 | 13.3 | 1030 | 70 | 870 | 34 | 530 | 15 | SUS 316 L |
| | 10 | 1150 | 9.1 | 970 | 100 | 860 | 19 | 410 | 22 | Incoloy 825 |
| Comparative Steels | 11 | 1150 | 10.0 | 950 | 110 | 860 | 23 | 480 | 20 | SUS 316 L |
| | 12 | 1150 | 10.0 | 930 | 90 | 840 | 18 | 430 | 20 | Incoloy 825 |
| | 13 | 1150 | 10.0 | 920 | 120 | 800 | 26 | 440 | 20 | Incoloy 825 |
| | 14 | 1150 | 10.0 | 960 | 100 | 830 | 20 | 470 | 20 | Incoloy 825 |
| | 15 | 1150 | 8.0 | 990 | 120 | 870 | 14 | 460 | 25 | Incoloy 825 |
| | 16 | 1150 | 8.0 | 940 | 80 | 870 | 17 | 420 | 25 | Incoloy 825 |
| | 17 | 1000 | 8.0 | 950 | 110 | 830 | 19 | 370 | 25 | Incoloy 825 |
| | 18 | 1280 | 10.0 | 980 | 90 | 870 | 25 | 420 | 20 | Incoloy 825 |
| | 19 | 1150 | 10.0 | 870 | 120 | 790 | 20 | 500 | 20 | Incoloy 825 |
| | 20 | 1150 | 10.0 | 1060 | 90 | 920 | 22 | 480 | 20 | Incoloy 825 |
| | 21 | 1150 | 10.0 | 940 | 45 | 870 | 21 | 440 | 20 | Incoloy 825 |
| | 22 | 1150 | 10.0 | 960 | 210 | 730 | 18 | 500 | 20 | Incoloy 825 |
| | 23 | 1150 | 8.0 | 930 | 80 | 820 | 3 | 460 | 25 | Incoloy 825 |
| | 24 | 1150 | 8.0 | 940 | 80 | 820 | 46 | 430 | 25 | Incoloy 825 |
| | 25 | 1150 | 4.5 | 980 | 100 | 880 | 21 | 480 | 25 | Incoloy 825 |
| | 26 | 1200 | 8.0 | 980 | 100 | 870 | 20 | 580 | 25 | Incoloy 825 |

| | No. | Properties of base metal | | | | Bonding of cladding material Defects detected by ultrasonic Probe | Corrosion-resistance of cladding material Corrosion resistance |
|---|---|---|---|---|---|---|---|
| | | YS (kgf/mm$^2$) | TS (kgf/mm$^2$) | vE$_{-30}$ (kgf-m) | vTrs (°C.) | | |
| Inventive Steels | 1 | 48.2 | 59.7 | 32.2 | −76 | No | No |
| | 2 | 50.3 | 60.3 | 25.6 | −80 | No | No |
| | 3 | 49.3 | 58.8 | 23.6 | −83 | No | No |
| | 4 | 49.2 | 59.2 | 35.6 | −74 | No | No |
| | 5 | 52.0 | 61.3 | 22.9 | −74 | No | No |

TABLE 1-continued

|  |  |  |  |  |  |  |  |
|---|---|---|---|---|---|---|---|
|  | 6 | 50.2 | 63.1 | 23.4 | −76 | No | No |
|  | 7 | 47.0 | 58.1 | 27.6 | −80 | No | No |
|  | 8 | 48.3 | 57.5 | 38.2 | −70 | No | No |
|  | 9 | 49.0 | 60.3 | 25.6 | −82 | No | No |
|  | 10 | 51.2 | 62.3 | 29.0 | −78 | No | No |
| Comparative | 11 | 47.8 | 57.8 | 28.3 | −46 | No | Yes |
| Steels | 12 | 50.3 | 59.4 | 26.4 | −57 | No | No |
|  | 13 | 48.9 | 58.9 | 26.9 | −52 | No | No |
|  | 14 | 51.2 | 60.9 | 32.8 | −56 | No | No |
|  | 15 | 48.8 | 58.9 | 26.8 | −54 | No | No |
|  | 16 | 48.9 | 63.2 | 12.3 | −37 | No | No |
|  | 17 | 38.6 | 50.5 | 30.6 | −80 | Yes | Yes |
|  | 18 | 52.0 | 61.3 | 10.1 | −35 | No | No |
|  | 19 | 49.8 | 59.9 | 26.7 | −78 | No | Yes |
|  | 20 | 50.8 | 60.6 | 25.7 | −46 | No | No |
|  | 21 | 49.2 | 60.5 | 26.9 | −68 | No | Yes |
|  | 22 | 46.3 | 54.4 | 28.8 | −64 | No | Yes |
|  | 23 | 41.9 | 51.0 | 30.2 | −73 | No | Yes |
|  | 24 | 48.5 | 65.1 | 18.7 | −28 | No | No |
|  | 25 | 49.0 | 58.9 | 8.9 | −32 | Yes | No |
|  | 26 | 45.2 | 54.3 | 26.7 | −75 | No | Yes |

What is claimed is:

1. A method of producing clad steel plate comprising the steps of obtaining an assembly slab by superposing a stainless steel cladding material and a base metal consisting essentially of, by weight,

| Carbon | 0.020 to 0.06% |
|---|---|
| Silicon | 0.5% or less |
| Manganese | 1.0 to 1.8% |
| Phosphorus | 0.03% or less |
| Sulfur | 0.005% or less |
| Niobium | 0.08 to 0.15% |
| Titanium | 0.005 to 0.03% |
| Aluminum | 0.05% or less |
| Nitrogen | 0.002 to 0.006% | with the balance being iron and unavoidable impurities;
seal-welding the periphery of the assembly slab;
heating the slab to a temperature in the range of 1100° to 1250° C.;
rolling the slab at a reduction ratio of 5 or more;
rolling the slab at a finish temperature of 900° to 1050° C.;
air cooling the slab for 60 to 200 seconds to promote recrystallization of γ structure;
cooling the slab from a temperature of at least 750° to an arbitrary temperature of 550° or below at a cooling rate of 5° to 40° C./sec; and
air cooling the slab.

2. The method according to claim 1 wherein the cladding material is a nickel alloy.

3. The method according to claim 2 wherein the base metal includes one or two elements selected from the group consisting of, by weight,

| Nickel | 0.05 to 1.0% |
|---|---|
| Copper | 0.05 to 1.0% |
| Chromium | 0.05 to 0.5% |
| Molybdenum | 0.05 to 0.3% |
| Calcium | 0.001 to 0.005%. |

4. The method according to claim 1 wherein the base metal includes one or two elements selected from the group consisting of, by weight,

| Nickel | 0.05 to 1.0% |
|---|---|
| Copper | 0.05 to 1.0% |
| Chromium | 0.05 to 0.5% |
| Molybdenum | 0.05 to 0.3% |
| Calcium | 0.001 to 0.005%. |

* * * * *